Figure 1:
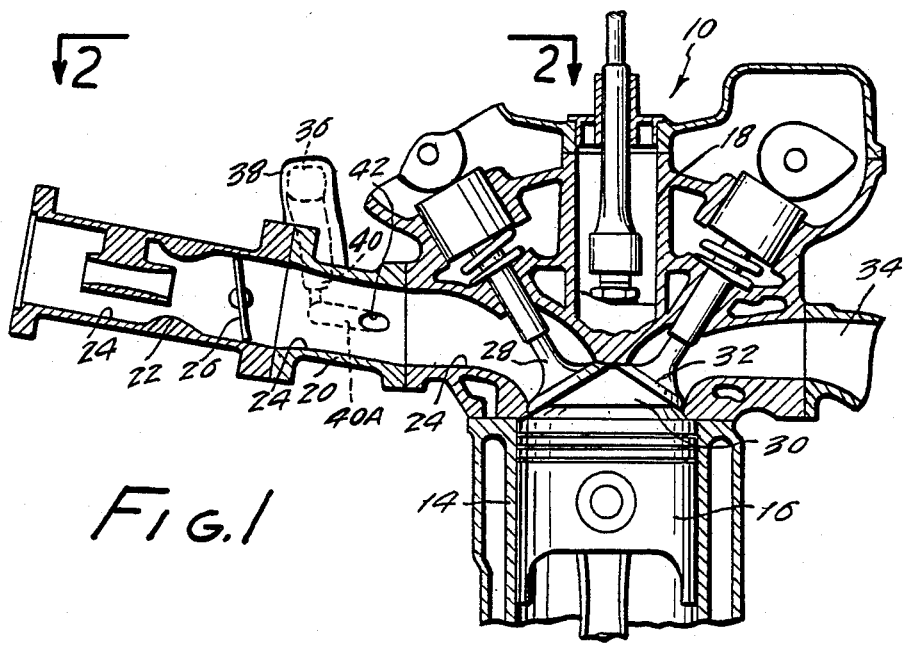

United States Patent [19]

Tezuka et al.

[11] Patent Number: 4,867,109

[45] Date of Patent: Sep. 19, 1989

[54] INTAKE PASSAGE ARRANGEMENT FOR INTERNAL COMBUSTION ENGINES

[76] Inventors: Etsuhiro Tezuka, 91-3 Mikatabaracho, Hamamatsu-shi, Shizuoka-ken; Koichiro Kaji, 3450 Nishikaizuka, Iwata-shi, Shizuoka-ken; Toru Ichinose, 1984-3 Shimoyamanashi, Fukuroi-shi, Shizuoka-ken, all of Japan

[21] Appl. No.: 792,223

[22] Filed: Oct. 25, 1985

Related U.S. Application Data

[63] Continuation of Ser. No. 410,390, Aug. 23, 1982, abandoned, which is a continuation of Ser. No. 115,414, Jan. 25, 1980, abandoned, which is a continuation of Ser. No. 854,260, Nov. 23, 1977, abandoned.

[30] Foreign Application Priority Data

Nov. 26, 1976 [JP] Japan .................................. 51-158222

[51] Int. Cl.⁴ .............................................. F02B 75/18
[52] U.S. Cl. .................................. 123/52 MB; 123/568
[58] Field of Search ............ 123/52 R, 52 M, 52 MB, 123/52 MC, 52 MV, 568

[56] References Cited

U.S. PATENT DOCUMENTS

| 1,698,099 | 1/1929 | Kingston | 123/568 |
| 3,664,316 | 5/1972 | Garcea | 123/52 M |
| 3,990,414 | 11/1976 | Malphettes | 123/52 MB |

FOREIGN PATENT DOCUMENTS

| 0982052 | 1/1976 | Canada | 123/568 |
| 445945 | 3/1968 | Switzerland | |
| 1195060 | 6/1970 | United Kingdom | 123/52 MB |
| 1380600 | 1/1975 | United Kingdom | 123/568 |

Primary Examiner—Craig R. Feinberg
Attorney, Agent, or Firm—Ernest A. Beutler

[57] ABSTRACT

A multi-cylinder internal combustion engine with an intake valve and a throttle valve respective to each cylinder. A respective intake passage interconnects each throttle and intake valve. At least one element of a charge flows through the intake passage. An intake balance conduit includes a plurality of branches and interconnects a plurality (preferably all) of the intake passages. The branches discharge into their respective intake passages at an acute angle relative to the direction of stream flow in the intake passage, preferably substantially downstream from the throttle valve. Exhaust gas recirculation means can optionally discharge into the conduit, preferably substantially downstream from the throttle valve.

30 Claims, 1 Drawing Sheet

U.S. Patent  Sep. 19, 1989  4,867,109

INTAKE PASSAGE ARRANGEMENT FOR INTERNAL COMBUSTION ENGINES

This application is a continuation of application Ser. No. 410,390, filed Aug. 23, 1982, now abandoned, which in turn is a continuation of application Ser. No. 115,414, filed Jan. 25, 1980, now abandoned, which in turn is a continuation of application Ser. No. 854,260, filed Nov. 23, 1977, now abandoned.

This invention relates to an intake passage arrangement for use in an multi-cylinder internal combustion engine equipped with an intake balance conduit communicating the respective passages.

In multi-cylinder internal combustion engines of the type having a plurality of separate intake throttle valves, it is known to provide an intake balance conduit to communicate the respective intake passages so as to balance variations in intake gas amount resulting from variations in throttle valve opening degree in the respective cylinders. Such a conventional intake balance conduit has been opened to the intake passages at a right angle to the longitudinal axis of the intake passages and in the vicinity of the throttle valves in the respective intake passages. This arrangement was satisfactory to balance the intake gas amount in the respective intake passages, but it has been found that it was not effective to provide maximum engine combustion performance. Additionally, where the intake balance conduit is utilized to effect exhaust gas recirculation (EGR) from the exhaust passages to the intake passages, impurities will build up and soil the throttle valves and the vicinity thereof to cause changes in the opening area of the intake passages when the engine is idling, which results in defective engine operation.

Therefore, the present invention has for its object to provide an improved intake passage arrangement for internal combustion engines which can eliminate the above disadvantages and which can positively improve combustion conditions in the cylinders.

In accordance with the present invention, there is provided an intake passage arrangement for a multi-cylinder internal combustion engine having a plurality of throttle valves in its respective intake passages, the arrangement comprising an intake balance conduit having its branch portions opened to each intake passage between the throttle valve and the intake valve so as to connect the respective intake passages with each other at an acute angle relative to the direction of stream of the intake gas mixture.

Preferably, carburetors having a throttle valve therein are connected through intake manifolds to the internal combustion cylinders, respectively, and the intake balance conduit is opened to the intake passages of the respective intake manifold so as to make large the distance between the throttle valve and the opening to the intake passage.

Also, intake balance conduit is preferably but optionally connected to an exhaust gas recirculation passage to effect exhaust gas recirculation from the exhaust passages through the intake balance conduit to the intake passages. This arrangement can reduce the number of required parts and results in a simple intake passage arrangement which can keep the throttle valves free from impurities while effecting exhaust gas recirculation performance.

Figure 2:
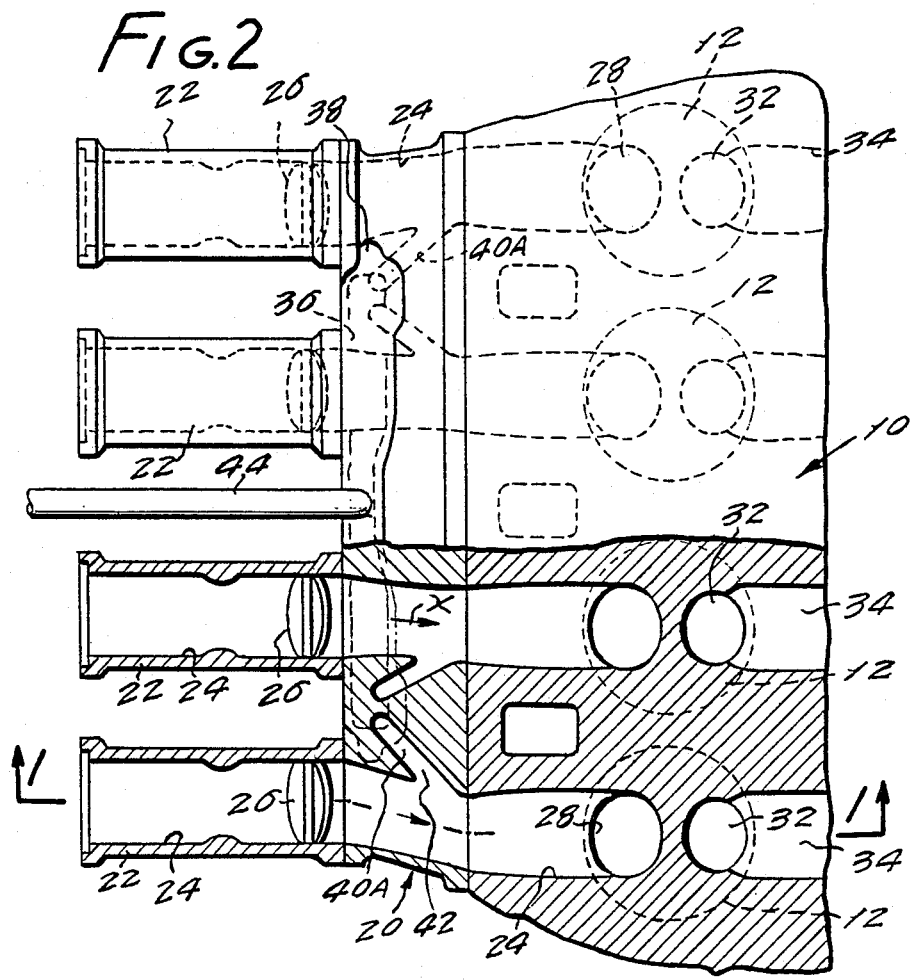

One embodiment of an intake passage arrangement according to the present invention will now be described, by way of example, with reference to the accompanying drawings in which:

FIG. 1 is a fragmentary axial section of the presently preferred embodiment of the invention; and FIG. 2 is a top view of FIG. 1, partly in cutaway cross-section.

A multi-cylinder internal combustion engine 10 has a plurality of cylinders, each comprising a cylinder 14, a piston 16, and a cylinder head 18 and connected through an intake manifold 20 to a carburetor 22. They are identical to one another. Therefore only one is shown in detail. The "intake manifold" 20 is actually an adaptive insert for the application of this invention. It can be interposed between the cylinder head and the carburetors, and serves as a spacer to provide a substantial spacing between the throttle valve and the intake valve 28 of the cylinder. Each reference numeral 24 designates one of a plurality of intake passages (in this case there are four intake passages), each having therein a respective throttle valve 26 for opening and closing whereby to control the amount of the intake gas mixture. This mixture is somtimes called a "charge". When a carburetor is used, the charge is a fuel/air mixture. If other charge forming means are used, then at least one element of the charge will flow through the intake passage.

In the illustrated embodiment, the carburetor for each cylinder has therein the throttle valve and part of the total intake passage downstream from the throttle valve. The air/fuel mixture in the intake passage is supplied through an intake valve 28 to a combustion chamber 30, and the exhaust gas after explosion is discharged through an exhaust valve 32 to an exhaust passage 34.

In the upper side of the intake manifold 20 there is provided an intake balance conduit 36 having branch portions 40 opened to the intake passages of the respective intake manifolds 20 at 42. The end portions 40A of the branch portions 40 are connected to the intake manifolds 20 at an acute angle (about 30°) relative to the direction of stream flow (indicated by the arrow X in FIG. 2) and the openings 42 are positioned between the throttle valve 26 and the intake valve 28. Preferably, the opening 42 is positioned relatively remote from the throttle valve 26 in order to prevent impurities from adhering to the throttle valve 26 and the vicinity thereof, even where an exhaust gas recirculation passage 44 is connected to the intake balance conduit 36 to effect exhaust gas recirculation from the exhaust passage 34 to the intake passage 24.

Furthermore, it is possible in accordance with the present invention to utilize the intake balance conduit as a starter conduit by introduction of warming up mixture into the intake balance conduit 36 to supply it into the engine from the opening 42.

The above described intake passage arrangement made in accordance with the present invention provides the following advantages: First, such an arrangement wherein the intake balanced conduit is connected to the intake passage at an acute angle with the direction of stream of the air/fuel mixture provides a balance intake gas introduction to positively form a stratified stream of intake gas, resulting in improved combustion conditions in the cylinders. As a result, the required advance of the ignition timing is retarded to reduce variations in combustion conditions when the engine is under low load conditions. This makes it easy to maintain the engine operation smooth. In this case, the opening 42 of the intake balance conduit is preferably positioned at a substantial distance from the throttle valve 26, and near the intake valve 28. Second, where the internal combustion engine is equipped with exhaust gas recirculation means, such an arrangement that the exhaust gas recirculation passage is connected to the intake balance conduit to recirculate the exhaust gas from the openings 42 to the intake passages 24 provides a simple intake passage arrangement capable of preventing impurities from adhering to the throttle valve 26 and the vicinity thereof. This provides a constant throttle valve opening area when the engine is idling so as to maintain the air/fuel ratio constant while the engine is idling.

This invention is not to be limited by the embodiment shown in the drawings and described in the description, which is given by way of example and not of limitation, but only in accordance with the scope of the appended claims.

We claim:

1. In a multiple-cylinder internal combustion engine, each said cylinder including an intake valve, an intake passage respective to said intake valve through which at least one element of a charge flows in a direction of stream flow, each said intake passage being bounded by a peripheral wall, and a throttle valve in each said intake passage spaced from the respective intake valve, the improvement comprising: an intake balance conduit which includes a plurality of branches for connecting all of said intake passages with each other and for providing flow therebetween, each one of said branches including a respective discharge means discharging fluid from its respective branch into its respective intake passage at an acute angle relative to said direction of stream flow in the respective intake passage for providing flow from each of said branches to discharge at an acute angle in a downstream direction into the respective intake passage to generate turbulence in the cylinder at low speeds, and an exhaust gas recirculation passage communicating between a region receiving exhaust gases from said cylinders and a central section of said intake balance conduit to effect exhaust gas recirculation of exhaust gases to the intake passages.

2. Apparatus according to claim 1 in which the branches open into their respective intake passages at a location substantially spaced from the respective throttle valve.

3. Apparatus according to claim 1 in which individual charge forming means is provided respective to each of said throttles.

4. Apparatus according to claim 3 in which the branches open into their respective intake passages at a location substantially spaced from the respective throttle valve.

5. Apparatus according to claim 3 in which an intake manifold is inerposed between the throttle valves and the intake valves to form part of the intake passages, thereby enlarging the distance between the throttle valves and the intake valves.

6. Apparatus according to claim 3 in which the charge forming means is a carburetor.

7. Apparatus according to claim 6 in which the branches open into their respective intake passages at a location substantially spaced from the respective throttle valve.

8. Apparatus according to claim 6 in which an intake manifold is interposed between the throttle valves and the intake valves to form part of the intake passages, thereby enlarging the distance between the throttle valves and the intake valves.

9. In an intake system for an internal combustion engine of a type having a combustion chamber, an intake pasage and an exhaust passage opening to the combustion chamber, and an intake valve and an exhaust valve disposed in said intake and exhaust passages to open and close the respective passages, said intake valve having a longitudinal axis and a peripheral edge, the improvement comprising a supply chamber and control passage means connected at one end to the supply chamber and being open at another end to a lower surface of the intake passage upstream of and in the immediate vicinity of the intake valve and being substantially directed at an angle offset from the longitudinal axis of the intake valve to a juncture formed upstream of the intake valve where the peripheral edge of the intake valve meets the intake passage, whereby intake mixture is drawn from the portion of intake passage lying adjacent the intake valve into the supply chamber through the control passage means upon closure of the intake valve, and the mixture in the supply chamber is fed to the combustion chamber through the control passage means upon opening of the intake valve.

10. An intake system for internal combustion engine as claimed in claim 9, wherein said control passage means opens to said intake passage at a portion of the latter at the upstream side of said intake valve.

11. An intake system for an internal combustion engine as claimed in claim 9, wherein said internal combustion engine is a four stroke cycle engine.

12. An intake system for an internal combustion engine as claimed in claim 11, wherein said control passage means opens to said intake passage at a portion of the latter at the upstream side of said intake valve 13. An intake system for an internal combustion engine as claimed in claim 9, wherein said control passage means comprises a single control passage.

14. An intake system for an internal combustion engine as claimed in claim 13, wherein said internal combustion engine is a four-stroke cycle engine.

15. An intake system for internal combustion engine as claimed in claim 13, wherein said control passage means opens to said intake passage at a portion of the latter at the upstream side of said intake valve.

16. An intake system for an internal combustion engine a claimed in claim 9 wherein said control passage means is directed in an offset direction from the center of said combustion chamber.

17. An intake system for an internal combustion engine as claimed in claim 16, wherein said control passage means comprises a single control passage.

18. An intake system for an internal combustion engine as claimed in claim 16, wherein said internal combustion engine is a four stroke cycle engine.

19. An intake system for internal combustion engine as claimed in claim 16, wherein said control passage means opens to said intake passage at a portion of the latter at the upstream side of said intake valve.

20. In an intake system for an internal combustion engine of a type having a combustion chamber, an intake passage and an exhaust passage opening to the combustion chamber, and an intake valve and an exhaust valve disposed in said intake and exhaust passages to open and close the respective passages, said intake valve having a longitudinal axis and a peripheral edge, the improvement comprising a supply chamber and control passage means connected at one end to the supply chamber and being open at another end to a surface of the intake passage upstream of and in the immediate vicinity of the intake valve and being substantially directed at an angle offset from the longitudinal axis of the intake valve to a juncture formed upstream of the intake valve where the peripheral edge of the intake view meets the intake passage, whereby intake mixture is drawn from the portion of intake passage lying adjacent the intake valve into the supply chamber through the control passage means upon closure of the intake valve, and the mixture in the supply chamber is fed to the combustion chamber through the control passage means upon opening of the intake valve.

21. An intake system for internal combustion engine as claimed in claim 20, wherein said control passage means opens to said intake passage at a portion of the latter at the upstream side of said intake valve.

22. An intake system for an internal combustion engine as claimed in claim 20, wherein said internal combustion engine is a four stroke cycle engine.

23. An intake system for an internal combustion engine as claimed in claim 22, wherein said control passage means opens to said intake passage at a portion of the latter at the upstream side of said intake valve.

24. An intake system for an internal combustion engine as claimed in claim 20, wherein said control passage means comprises a single control passage.

25. An intake system for an internal combustion engine as claimed in claim 24, wherein said internal combustion engine is a four stroke cycle engine.

26. An intake system for internal combustion engine as claimed in claim 24, wherein said control passage means opens to said intake passage at a portion of the latter at the upstream side of said intake valve 27. An intake system for an internal combustion engine as claimed in claim 20 wherein said control passage means is directed in an offset direction from the center of said combustion chamber.

28. An intake system for an internal combustion engine as claimed in claim 27, wherein said control passage means comprises a single control passage.

29. An intake system for an internal combustion engine as claimed in claim 27, wherein said internal combustion engine is a four stroke cycle engine.

30. An intake system for internal combustion engine as claimed in claim 27, wherein said control passage means opens to said intake passage at a portion of the latter at the upstream side of said intake valve.

* * * * *